United States Patent
Miao et al.

(10) Patent No.: US 12,496,685 B2
(45) Date of Patent: Dec. 16, 2025

(54) ABRASIVE WATER JET NOZZLE FOR STRENGTHENING

(71) Applicant: Jiangnan University, Wuxi (CN)

(72) Inventors: Xiaojin Miao, Wuxi (CN); Meiping Wu, Wuxi (CN); Chenlong Ma, Wuxi (CN); Quanlong Wang, Wuxi (CN); Chunlei Zhang, Wuxi (CN); Shuxin Teng, Wuxi (CN); Jun Zhang, Wuxi (CN); Kan Xu, Wuxi (CN); Yiwen Chen, Wuxi (CN)

(73) Assignee: Jiangnan University, Wuxi (CN)

( * ) Notice: Subject to any disclaimer, the term of this patent is extended or adjusted under 35 U.S.C. 154(b) by 476 days.

(21) Appl. No.: 18/068,135

(22) Filed: Dec. 19, 2022

(65) Prior Publication Data
US 2023/0330813 A1 Oct. 19, 2023

(30) Foreign Application Priority Data
Apr. 15, 2022 (CN) .......................... 202210396992.9

(51) Int. Cl.
*B24C 5/04* (2006.01)
*B24C 7/00* (2006.01)

(52) U.S. Cl.
CPC .............. *B24C 5/04* (2013.01); *B24C 7/0007* (2013.01)

(58) Field of Classification Search
CPC ...... B24C 1/045; B24C 45/02; B24C 47/0007
USPC ................................... 451/38, 102
See application file for complete search history.

(56) References Cited

U.S. PATENT DOCUMENTS

| 8,187,056 B2 * | 5/2012 | Hashish | B24C 3/325 451/60 |
| 8,210,908 B2 * | 7/2012 | Hashish | B24C 7/0061 451/38 |
| 2004/0107810 A1 * | 6/2004 | Sciulli | B24C 1/045 83/177 |

FOREIGN PATENT DOCUMENTS

CN 112452577 A * 3/2021 ........... B05B 7/0416

OTHER PUBLICATIONS

Machine translation of CN-112452577-A (Year: 2021).*

* cited by examiner

*Primary Examiner* — Robert F Neibaur
(74) *Attorney, Agent, or Firm* — IDEA Intellectual Limited; Sam T. Yip

(57) ABSTRACT

An abrasive water jet nozzle for strengthening, including a chamber, providing a mixing space; and a strengthening mixing assembly, providing a strengthening mixing of water with an abrasive entering the chamber, wherein the strengthening mixing assembly includes a fluid passage and a water stopper block, wherein the water stopper block is located at an eccentric position on one side of the chamber, and an outlet of the fluid passage faces the water stopper block. The provided abrasive water jet nozzle is capable of fully mixing high speed water with the abrasive particles after the high speed water entering the mixing chamber, so as to ensure the uniformity of the strengthening effect, and the formed abrasive water jet is a large circular fan-shaped jet, which can greatly improve the strengthening quality of the abrasive water jet.

13 Claims, 7 Drawing Sheets

ABRASIVE WATER JET NOZZLE FOR STRENGTHENING

FIELD OF THE INVENTION

The invention belongs to the technical field of nozzles, in particular to an abrasive water jet nozzle for strengthening.

BACKGROUND OF THE INVENTION

With the development of science and technology, many modern advanced strengthening technologies have emerged. Water jet strengthening technology has gradually occupied a place by virtue of its good surface quality, high processing flexibility, green environmental protection and other characteristics, and has great advantages in surface strengthening of complex shaped structural parts. The surface roughness after pure water jet strengthening is low, but the improvement effect of surface hardness and residual compressive stress is inferior to that of shot peening strengthening.

As a new wet green shot peening strengthening process, the abrasive water jet strengthening technology combines the advantages of pure water jet strengthening and shot peening strengthening. The abrasive particles carry huge energy to impact the metal target, and the presence of water forms a water medium adsorption film between the abrasive particles and the metal surface, which improves the friction state between the abrasive particles and the metal surface, and has a better comprehensive strengthening effect.

In conventional, the most widely used post mixed abrasive water jet device has poor mixing effect on abrasive particles and high-speed water, resulting in uneven strengthening effect. In addition, the jet beam from the existing nozzle is very thin, resulting in very low enhancement efficiency.

SUMMARY OF THE INVENTION

The purpose of this part is to outline some aspects of embodiments of the invention and to briefly introduce some better embodiments. Some simplifications or omissions may be made in this part and in the abstract of the specification and the title of the invention in this application to avoid ambiguity of the purpose of this part, the abstract of the specification and the title of the invention, and such simplifications or omissions shall not be used to limit the scope of the invention.

In view of the above existing problems, the present invention is proposed.

The invention aims at providing an abrasive water jet nozzle for strengthening, ensuring the uniformity of the strengthening effect, and greatly improving the strengthening quality of the abrasive water jet.

For solving the foregoing problems, in accordance to one aspect of the present invention, an abrasive water jet nozzle for strengthening is provided. The abrasive water jet nozzle for strengthening includes: a chamber (N1), providing a mixing space; and a strengthening mixing assembly, providing a strengthening mixing of water with abrasive entering said chamber (N1), wherein the strengthening mixing assembly includes a fluid passage (101) and a water stopper block (102), wherein the water stopper block (102) is located in an eccentric position on one side of the chamber (N1), and an outlet of the fluid passage (101) is directed towards the water stopper block (102).

In an embodiment of the method, wherein the water stopper block (102) has an impact surface (102a) and a dispersion surface (102b), the impact surface (102a) is curved, the dispersion surface (102b) is symmetrically disposed on both sides of the impact surface (102a), the dispersion surface (102b) extends outward from the impact surface (102a) in a direction of an inner wall of the chamber (N1), and the dispersion surface (102b) has an arcuate transition with the inner wall of the chamber (N1).

In an embodiment of the method, wherein the water stopper block (102) has a length along axial direction of the chamber (N1), thickness of the water stopper block (102) projecting out of the inner wall of the chamber (N1) is gradually decreased from the impact surface (102a) downwards.

In an embodiment of the method, wherein inlet of the fluid passage (101) is set along the axial direction of the chamber (N1), and the fluid passage (101) is a curved tube with a gradual angle change.

In an embodiment of the method, wherein two abrasive inlets (103) are disposed symmetrically on the chamber (N1), mid-perpendicular surface of axis line of the two abrasive inlets (103) coinciding with a symmetrical surface of the water stopper block (102).

In an embodiment of the method, wherein the chamber (N1) is separated into two mixing chambers (N2) at the bottom by a chamber dividing block (104), and a mixing fluid outlet (P1) is disposed with each mixing chambers (N2) correspondingly, wherein the chamber dividing block (104) is located on the mid-perpendicular plane of the axis line of the two abrasive inlets (103), axis of the mixing fluid outlet (P1) and axis of the abrasive inlet (103) are at the same plane.

In an embodiment of the method, wherein a focusing tube (105) is disposed with the mixing liquid outlet (P1), the focusing tube (105) has a jet outlet (105a) inside, and the jet outlet (105a) has a characteristic that a spacing of one opposite side is greater than another spacing of another opposite side.

In an embodiment of the method, wherein the focusing tube (105) is capable of rotating axially; wherein, the mixing fluid outlet (P1) is provided with a connecting tube (106), the focusing tube (105) extends into the connecting tube (106), and the focusing tube (105) and the connecting tube (106) are sealed by a sealing ring sleeved on the outside of the focusing tube (105).

In an embodiment of the method, wherein the focusing tube (105) is capable of rotating axially, wherein the mixing fluid outlet (P1) is provided with a connecting tube (106), the focusing tube (105) extends into the connecting tube (106), and a connection between the focusing tube (105) and the connecting tube (106) is established through an angle limiting mechanism (107).

In an embodiment of the method, wherein the angle limiting mechanism (107) comprises a rotating member (107a) disposed on the focusing tube (105) and a limiting member (107b) disposed on the connecting tube (106); the rotating member (107a) is provided with a number of limiting units (M) arranged in a circumferential direction, the limiting units (M) include a groove (107a-1), a bulge (107a-2) and an arc (107a-3) transiently connected between the groove (107a-1) and the bulge (107a-2), and adjacent grooves (107a-1) have a preset rotation angle; and radial distance from the arc (107a-3) to axis increases gradually in the direction from the groove (107a-1) to the bulge (107a-2); the limiting member (107b) comprises a ball (107b-1) and an operating tube (107b-2), the connecting tube (106) is provided with an opening capable of accommodating the ball (107b-1); the operating tube (107b-2) is sleeved on the outside of the connecting tube (106), the operating tube (107b-2) has a first wall (S1) and a second wall (S2), and the operating tube (107b-2) is capable of being moved along the connecting tube (106) to change axial positions of the first wall (S1) and the second wall (S2); when the ball (107b-1) contacts the first wall (S1), the ball (107b-1) is only located in the groove (107a-1); and when the ball (107b-1) contacts the second wall (S2), the ball (107b-1) contacts the bulge (107a-2).

Based on above, compared with the conventional art, the invention has the following beneficial effects: after entering the mixing chamber, the high-speed water can be fully mixed with the abrasive particles to ensure the uniformity of the strengthening effect. Furthermore, the formed abrasive water jet is a fan-shaped jet with a large central angle, which can greatly improve the strengthening quality of the abrasive water jet.

BRIEF DESCRIPTION OF THE DRAWINGS

Embodiments of the invention are described in more details hereinafter with reference to the drawings, in which.

DETAILED DESCRIPTION

In order to make the above purposes, features and advantages of the invention more obvious and easy to understand, the specific embodiments of the invention are explained in detail in the following with the drawings attached to the specification.

Many specific details are described in the following description in order to fully understand the invention, but the invention can also be implemented in other ways different from those described herein, and persons skilled in the art can do similar promotion without violating the meaning of the invention, so the invention is not limited by the specific embodiment disclosed below.

Secondly, the "one embodiment" or "embodiment" herein refers to a specific feature, structure or feature that can be included in at least one implementation of the invention. The words "in one embodiment" appearing in different places in this specification do not all refer to the same embodiment, nor are they separate or selectively mutually exclusive with other embodiments.

Unless otherwise specified, the raw materials used in the embodiment are commercially purchased.

Embodiment 1

Figure 2:
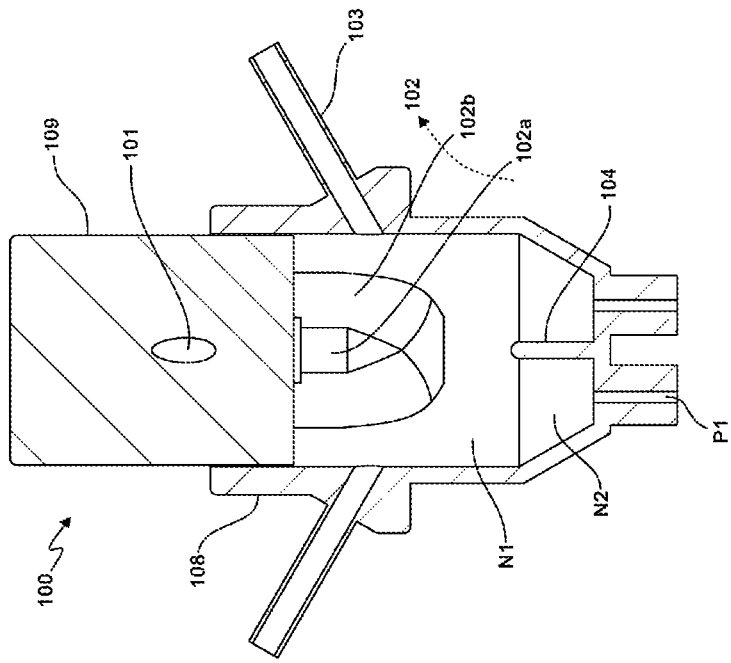
FIG. 2 is a sectional diagram in the main view direction of Embodiment 1 of the present invention.
Figure 1:
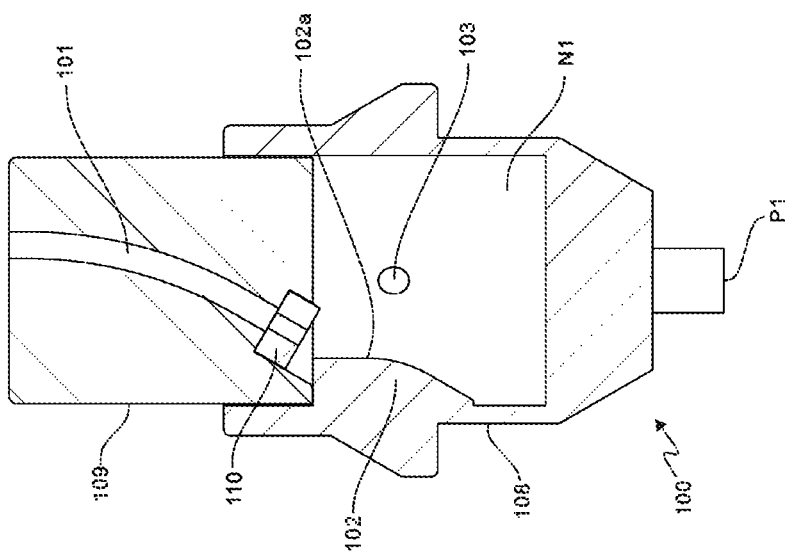
FIG. 1 is a sectional diagram in the side view direction of Embodiment 1 of the present invention.
Figure 3:
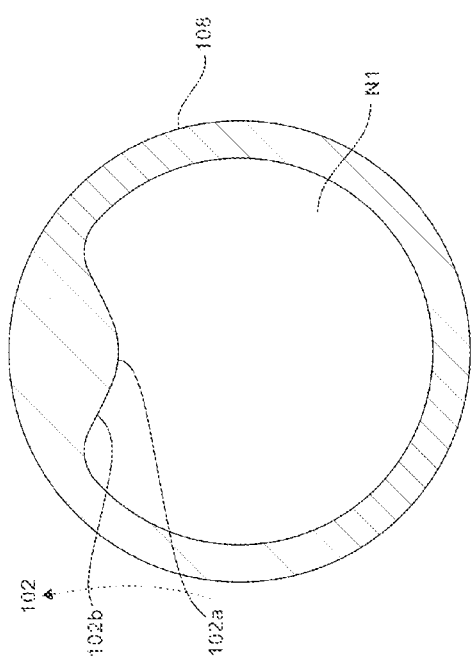
FIG. 3 is a sectional diagram of the water stopper block of Embodiment 1 of the present invention.

As shown in FIGS. 1 to 3, the embodiment 1 of the invention provides an abrasive water jet nozzle 100. The abrasive water jet nozzle 100 is internally provided with a chamber N1 for providing a mixing space. A strengthening mixing component is arranged in the chamber N1, which is used to provide strengthening mixing of water and abrasive entering the chamber N1.

Wherein, the strengthening mixing component includes a fluid passage 101 and a water stopper block 102, the water stopper block 102 is located at the eccentric position of one side of the chamber N1, while the inlet of the fluid passage 101 is located at the eccentric position of the top of the abrasive water jet nozzle 100, and is disposed along the axial direction of the chamber N1. The fluid passage 101 is a curved tube with a gradual angle, and the outlet of the fluid passage 101 faces the water stopper block 102. The high-pressure water flows into the fluid passage 101 and the chamber N1, and the high-speed water impacts the water stopper block 102 to occur reflection and gyration, so as to break the law that the high-speed water beam speed decreases from the axis to the periphery. In order to increase the speed of the water impacting on the water stopper block 102, a gem water nozzle 110 can be installed at the outlet of the fluid passage 101.

Specifically, the water stopper block 102 has an impact surface 102a and a dispersion surface 102b. The impact surface 102a is arc-shaped. The dispersion surface 102b is symmetrically arranged on both sides of the impact surface 102a. The dispersion surface 102b extends outward from the impact surface 102a to the inner wall of chamber N1. The dispersion surface 102b and the inner wall of chamber N1 are arc-shaped. The water stopper block 102 has a length along the axial direction of the chamber N1, and the thickness of the water stopper block 102 protruding from the inner wall of the chamber N1 gradually decreases from the impact surface 102a downward. With this shape and structure, it is possible to realize the reflection and gyration of high-speed water beam impacting the water stopper block 102.

It should be noted that the chamber N1 is symmetrically equipped with two abrasive inlets 103, and the mid-perpendicular plane of the axis line of the two abrasive inlets 103 coincides with the symmetrical plane of the water stopper block 102. In order to facilitate manufacturing and installation, the abrasive water jet nozzle 100 is provided with a housing 108, a chamber N1 is set inside the housing 108, and the top of the housing 108 is in an open shape. A water outlet seat 109 is installed at the top opening of the housing 108. The fluid passage 101 is formed inside the water outlet seat 109, the inlet of the fluid passage 101 is located at the top of the water outlet seat 109, and the outlet of the fluid passage 101 is located at the bottom of the water outlet seat 109; The bottom of the water outlet seat 109 extends into the opening, and the top of the water stopper block 102 is a plane, which acts as a limiting part. The bottom of the water outlet seat 109 contacts the plane and then limits, such that the outlet of the fluid passage 101 faces the impact surface 102a of the water stopper block 102. The water outlet seat 109 and the housing 108 can be fixed by welding, threaded connection and other conventional fixing methods.

Wherein, the bottom of chamber N1 is divided into two mixing chambers N2 by chamber dividing block 104, and the mixing chamber N2 is respectively provided with mixing fluid outlet P1; The chamber dividing block 104 is located on the mid-perpendicular plane of the axis line of the two abrasive inlets 103; The axis of the mixing fluid outlet P1 and the axis of the abrasive inlet 103 are at the same plane.

In combination with FIGS. 1 and 2, the high-pressure water flows into the fluid passage 101, and after bending and deflection, it shoots into the chamber N1 from the gem water nozzle 110. The high-speed water impacts the water stopper block 102 to occur the reflection and gyration, so as to break the law that the high-speed water beam speed decreases from the axis to the periphery. The chamber dividing block 104 at the bottom of the chamber N1 divides the bottom chamber into two relatively independent mixing chambers N2. The abrasive particles enter the chamber N1 from the abrasive inlet 103 on both sides respectively. The abrasive particles and high-speed water enter the two mixing chambers N2 for further full mixing after the initial mixing of the chamber N1. The mixed liquid is ejected through the mixing fluid outlet P1, and finally forms the abrasive water jet.

Embodiment 2

Figure 4:
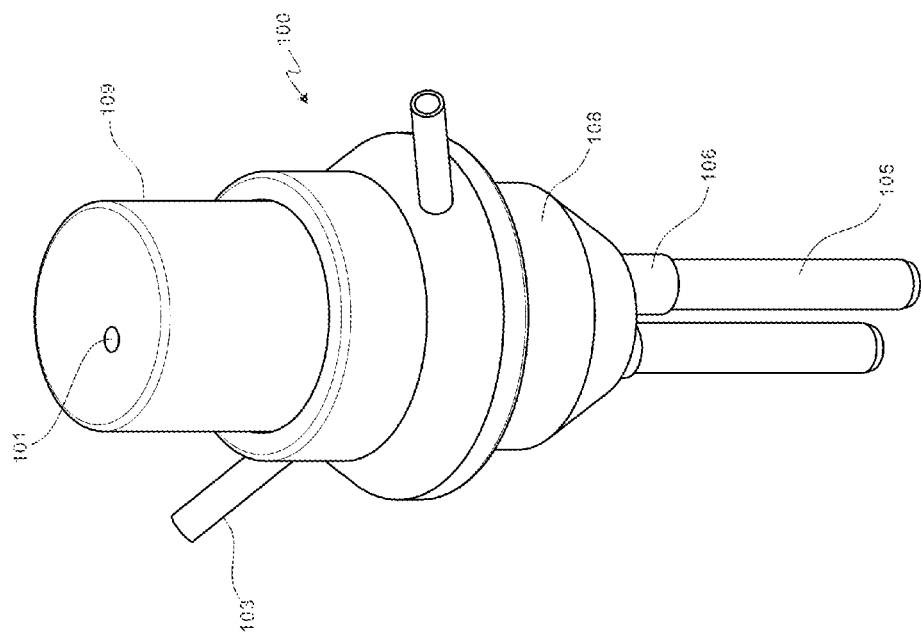
FIG. 4 is a schematic diagram of overall structure of Example 2 of the present invention.
Figure 6:
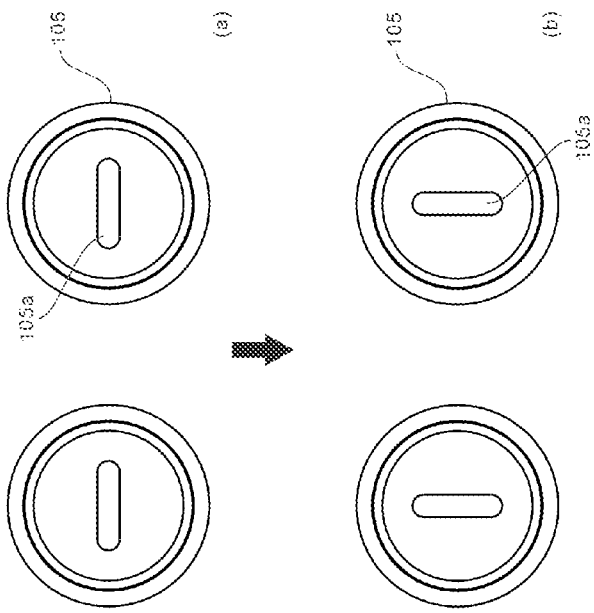
FIG. 6 is a schematic diagram of different combinations of the two focusing tubes in Embodiment 2 of the present invention.
Figure 5:
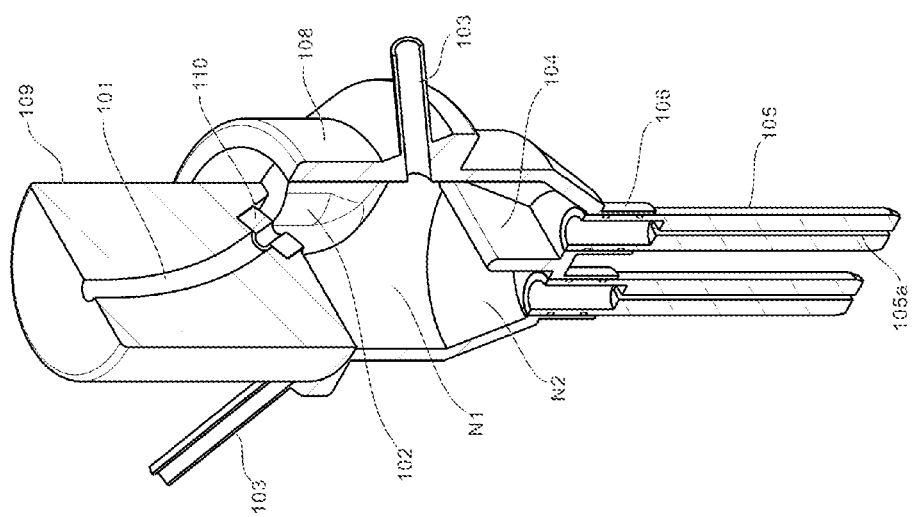
FIG. 5 is a schematic diagram of internal structure of FIG. 4.

As shown in FIGS. 4 to 6, this is the embodiment 2 of the invention. The difference between this embodiment and the embodiment 1 is that the mixing fluid outlet P1 is provided with a connecting tube 106, the connecting tube 106 is connected with a focusing tube 105, the focusing tube 105 is provided with a jet outlet 105a, and the jet outlet 105a has the characteristic that a spacing of one opposite side is greater than another spacing of another opposite side. The section shape of the jet outlet 105a can be oval, long key, waist hole, rectangle and other similar shapes.

It should be noted that the focusing tube 105 can rotate axially, and the long and short sides of the jet outlet 105a can be switched by rotating the focusing tube 105 (generally 90°). Among them, the focusing tube 105 extends into the connecting tube 106, and the focusing tube 105 and the connecting tube 106 are sealed by a sealing ring sleeved on the outside of the focusing tube 105, which can ensure that there is no leakage of abrasive water jet when rotating.

In combination with FIG. 6, this embodiment uses two focusing tubes 105, and sets the section of the outlet to a long key shape, so that the contact between the final shot abrasive water jet and the workpiece changes from the traditional point contact to a long line contact, which can greatly reduce the number of back and forth passes, and improve the strengthening efficiency several times. On the other hand, different combinations of the two focusing tubes 105 can have different effects. If the two outlets are arranged on the same line (as shown in portion (a) of FIG. 6), the contact line between the abrasive water jet and the workpiece will be longer, which can further improve the strengthening efficiency. If the two outlets are arranged in parallel (as shown in portion (b) of FIG. 6), the effect of nozzle going through one line to perform strengthening twice actually can be achieved.

Embodiment 3

As shown in FIGS. 7 to 13, this is the embodiment 3 of the invention. The difference between this embodiment and the above embodiments is that the connection between the focusing tube 105 and the connecting tube 106 is established through an angle limiting mechanism 107, which defines the rotation angle (generally 90°) of the focusing tube 105. Once rotated, the long and short sides of the jet outlet 105a can be switched, such that two outlets are arranged on one line or two outlets are arranged in parallel with no additional angle adjustment required.

Specifically, the angle limiting mechanism 107 includes a rotating member 107a disposed on the focusing tube 105 and a limiting member 107b disposed on the connecting tube 106.

Figure 8:
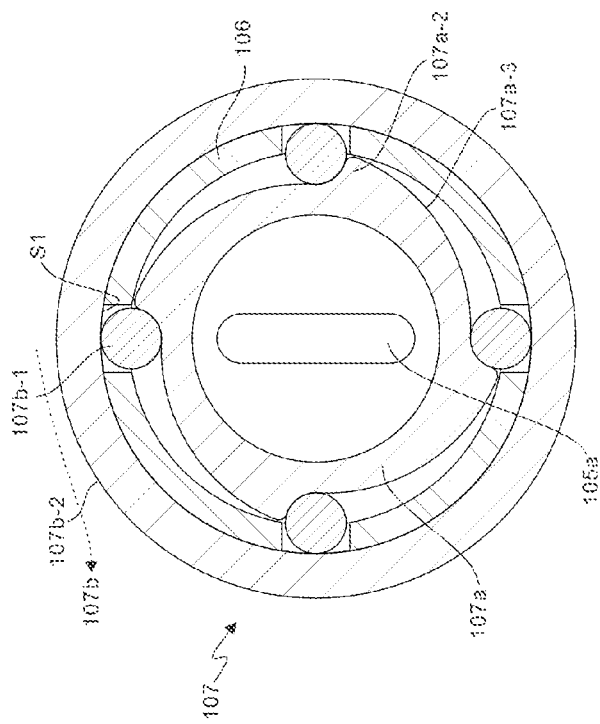
FIG. 8 is the structural diagram of the angle limiting mechanism in FIG. 7.
Figure 10:
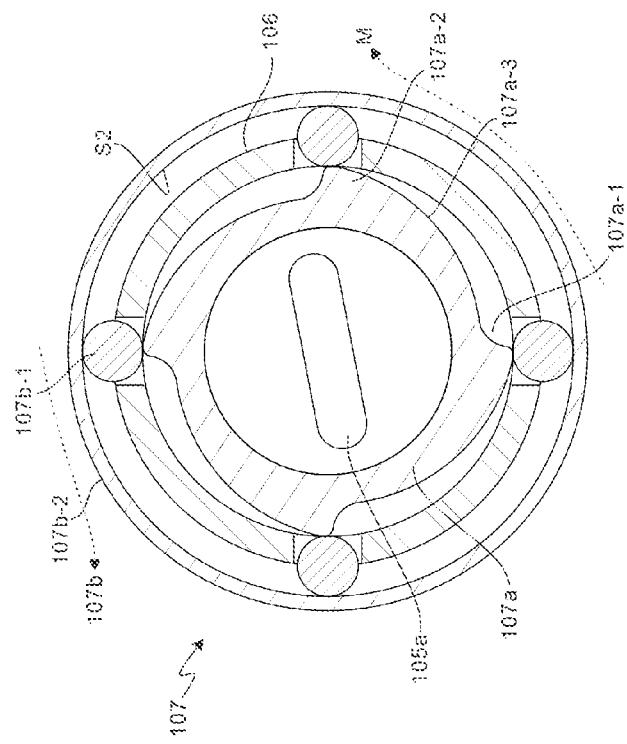
FIG. 10 is the structural diagram of the angle limiting mechanism in FIG. 9.

The rotating member 107a is installed on the top end face of the focusing tube 105 in a hollow column shape, and both are coaxial. The internal part of the rotating member 107a is connected with the jet outlet 105a; The outer wall of the rotating member 107a is provided with a number of limiting units M arranged in a circumferential direction. The limiting units M include a groove 107a-1, a bulge 107a-2, and an arc 107a-3 transiently connected between the groove 107a-1 and the bulge 107a-2. The adjacent grooves 107a-1 have a preset rotation angle (such as 90) °; The radial distance from arc 107a-3 to axis increases gradually in the direction from groove 107a-1 to bulge 107a-2. Specifically, as shown in FIGS. 8 and 10, this embodiment is provided with four limit units M, and the two adjacent limit units M are "connected head to tail", that is, the groove 107a-1 of the former limit unit M is connected with the bulge 107a-2 of the latter limit unit M, and the groove 107a-1 and the bulge 107a-2 form an arc notch that can accommodate the ball 107b-1. In addition, the groove 107a-1 and the bulge 107a-2 are transited through an arc.

The limiting member 107b comprises a ball 107b-1 and an operating tube 107b-2. The connecting tube 106 is composed of a small diameter tube section 106a and a large diameter tube section 106b which are integrally formed on the same axis. The small diameter tube section 106a is provided with an opening which can accommodate the ball 107b-1. The operating tube 107b-2 is sleeved on the outside of the small diameter tube section 106a. The operating tube 107b-2 has a first wall S1 and a second wall S2. Both the first wall S1 and the second wall S2 are inner walls. The inner diameter of the first wall S1 is smaller than the inner diameter of the second wall S2. The operating tube 107b-2 can move along the connecting tube 106 to change the axial positions of the first wall S1 and the second wall S2.

When the ball 107b-1 contacts the first wall S1, the ball 107b-1 can only be located in the groove 107a-1; and when the ball 107b-1 contacts the second wall S2, the ball 107b-1 can contact the bulge 107a-2.

Figure 7:
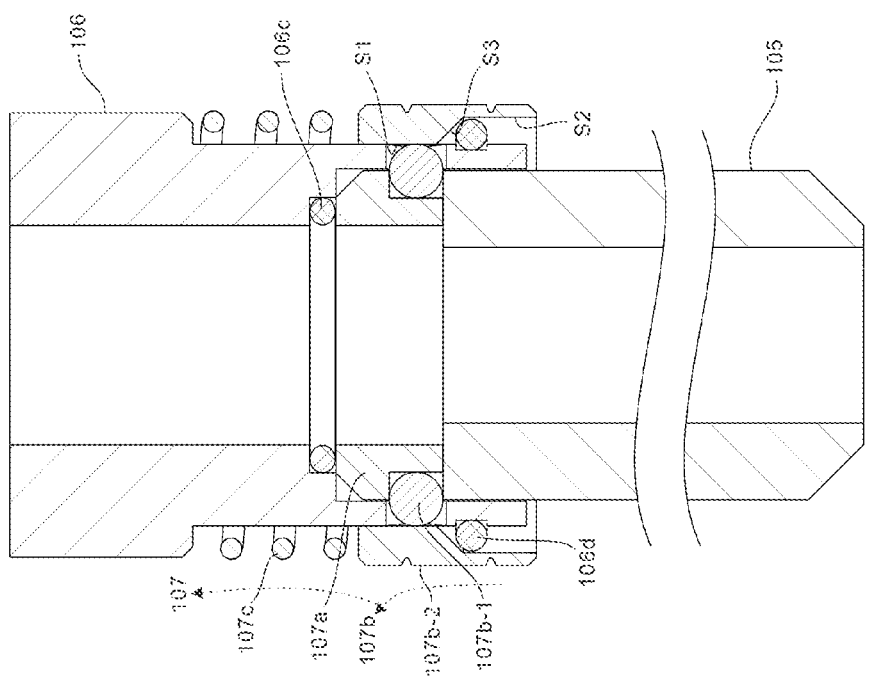
FIG. 7 is the schematic diagram of a connection structure between the focusing tube and the connecting tube in the locking state in Embodiment 3 of the present invention.

With reference to FIGS. 7 and 8, when the ball 107b-1 is located in the groove 107a-1, move the first wall S1 of the operating tube 107b-2 to the opening position of the small diameter tube section 106a. At this time, both sides of the ball 107b-1 are respectively in contact with the groove 107a-1 and the first wall S1, that is, the distance from the first wall S1 of the operating tube 107b-2 to the groove 107a-1 is just equal to the diameter of the ball 107b-1. The wall thickness of the first wall S1 of the operating tube 107b-2, namely, the length of the opening, is smaller than the diameter of the ball 107b-1, and preferably equal to the radius length of the ball 107b-1.

Referring to FIG. 8, rotating the focusing tube 105 and its top rotating member 107a in a counterclockwise direction. Since the ball 107b-1 is restricted from moving left and right in the opening, and the bulge 107a-2 cannot cross the ball 107b-1, the counterclockwise rotation is restricted. Rotating the focusing tube 105 and its top rotating member 107*a* in a clockwise direction. When the arc 107*a*-3 rotates in a clockwise direction, compared with the ball 107*b*-1, the distance between it (107*a*-3) and the inner wall of the small diameter tube section 106*a* is gradually reduced. Since the ball 107*b*-1 is limited by the first wall S1 of the operating tube 107*b*-2 and cannot move radially, the trend of the distance between the arc 107*a*-3 and the inner wall of the small diameter tube section 106*a* is limited, that is, the clockwise rotation is limited. FIG. 7 and FIG. 8 are schematic diagrams of the focusing tube 105 during locking.

Figure 9:
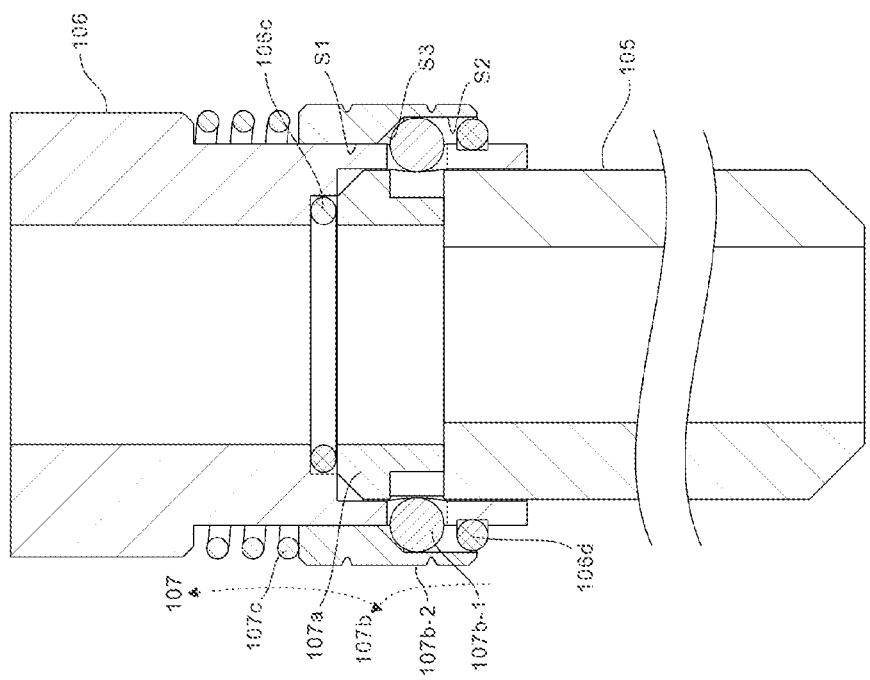
FIG. 9 is the schematic diagram of the connection structure between the focusing tube and the connecting tube in the rotation state in Embodiment 3 of the present invention.
Figure 12:
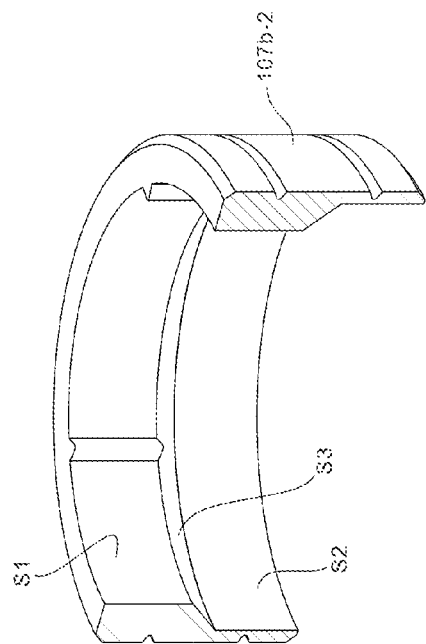
FIG. 12 is the structural diagram of the operating tube in Embodiment 3 of the present invention.

In combination with FIGS. 9 and 10, moving the second wall S2 of the operating tube 107*b*-2 to the opening position of the small-diameter tube section 106*a*. At this time, rotating the focusing tube 105 and its top rotating member 107*a* clockwise, gradually push the ball 107*b*-1 through the opening and move radially under the action of the arc 107*a*-3 until the bulge 107*a*-2 contacts the ball 107*b*-1. The minimum distance between the second wall S2 of the operating tube 107*b*-2 and the bulge 107*a*-2 is equal to or slightly greater than the diameter of the ball 107*b*-1, The radial movement distance of the ball 107*b*-1 can meet the position that the bulge 107*a*-2 passes over the ball 107*b*-1. When the position of the groove 107*a*-1 corresponds to the ball 107*b*-1, the ball 107*b*-1 falls into the groove 107*a*-1 again to complete the rotation of the preset angle (90°). The ball 107*b*-1 and the rotating part 107*a* are both made of metal. When the ball 107*b*-1 falls into the groove 107*a*-1 again, the ball 107*b*-1 collides with the wall of the groove 107*a*-1, such that the operator can hear the metal impact sound, which can be used to judge whether it is rotated in place.

Figure 11:
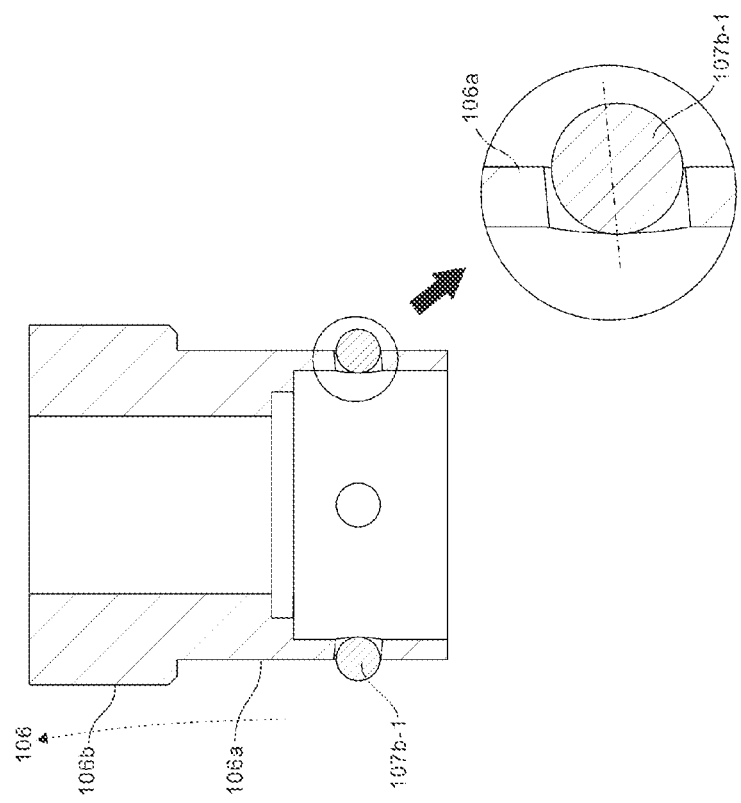
FIG. 11 is the structural diagram of the connecting tube in Embodiment 3 of the present invention.

In order to make the ball 107*b*-1 fall into the groove 107*a*-1 actively, as shown in FIG. 11, the opening of the small diameter tube section 106*a* is set to slightly tilt upward. When the position of the groove 107*a*-1 is rotated to the ball 107*b*-1, the inner side of the ball 107*b*-1 does not have any contact, and the ball 107*b*-1 can automatically fall into the groove 107*a*-1 under the action of the inclined plane and gravity.

Figure 13:
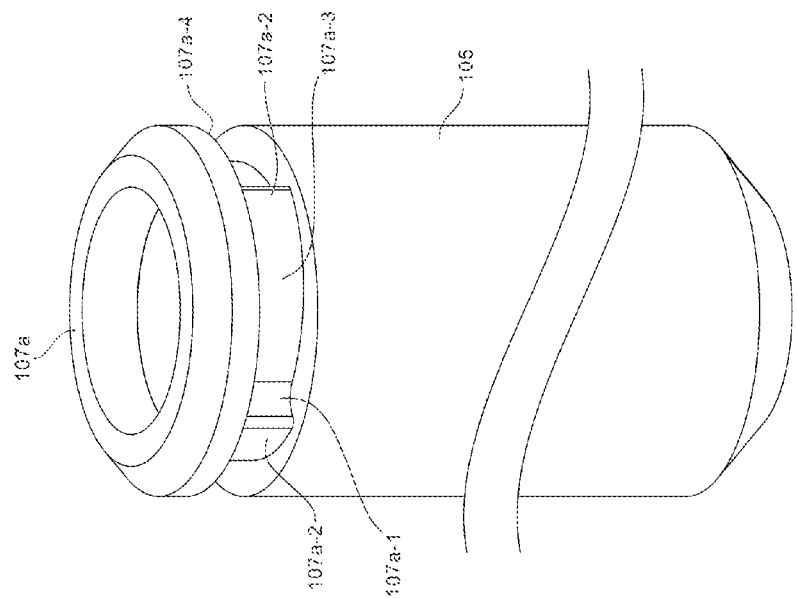
FIG. 13 is a structural diagram of the rotating part on the focusing tube in Embodiment 3 of the present invention.

Referring to FIGS. 7, 9 and 13, the upper part of the operating tube 107*b*-2 is the first wall S1, and the lower part is the second wall S2. The operating tube 107*b*-2 and the large-diameter tube section 106*b* are connected by a spring 107*c* sleeved on the outside of the small-diameter tube section 106*a*. Under the preload of the spring 107*c*, the first wall S1 on the upper part of the operating tube 107*b*-2 is located at the opening position of the small-diameter tube section 106*a*, and this state is maintained, so as to maintain the fixed position of the focusing tube 105. Pushing the operating tube 107*b*-2 upward to move toward the spring 107*c*, such that the second wall S2 at the lower part of the operating tube 107*b*-2 moves to the opening position of the small-diameter tube section 106*a*, and then a rotation operation is performed.

The first wall S1 and the second wall S2 are transited through a third wall S3. The third wall S3 is a cone-shape plane. When the operating tube 107*b*-2 moves downward, the third wall S3 contacts the ball 107*b*-1 and can push the ball 107*b*-1 into the opening under the action of the cone, which can further ensure that all the balls 107*b*-1 can fall into the groove 107*a*-1.

The ball 107*b*-1 can also be used as a limiting part to limit the focusing tube 105 from axial falling off. Specifically, the rotating part 107*a* is also provided with a stop ring 107*a*-4, which covers the top of the limit unit M, and the distance between the stop ring 107*a*-4 and the top end face of the focusing tube 105 is just make that Ball 107*b*-1 can fully enter slot 107*a*-1. As shown in FIG. 7, the stop ring 107*a*-4 at this time cannot move up and down because the ball 107*b*-1 is limited in the opening, so as to limit the axial fall off of the focusing tube 105

With reference to FIG. 9, when the focusing tube 105 rotates, the radial movement of the ball 107*b*-1 may cause the stop ring 107*a*-4 to fall off without any restriction. Therefore, with reference to FIG. 13, the highest point of the groove 107*a*-2, namely, its radial farthest part, is smaller than the outer diameter of the stop ring 107*a*-4, that is, the entire groove 107*a*-2 is still completely covered by the stop ring 107*a*-4. During the rotation of the focusing tube 105, The maximum moving position of ball 107*b*-1 is to contact the highest point of groove 107*a*-2. At this time, part of ball 107*b*-1 is still within the coverage of stop ring 107*a*-4, which can prevent the axial fall off of focusing tube 105.

In order to ensure the sealing performance, the connecting tube 106 is provided with seals, which are respectively the sealing gasket 106*c* and the sealing ring 106*d*. The sealing gasket 106*c* is located inside the connecting tube 106, and the sealing gasket 106*c* contacts the top of the rotating part 107*a*. Especially in the state shown in FIG. 7, the top of the rotating part 107*a* is in the state of extruding the sealing gasket 106*c*; The sealing ring 106*d* is sleeved on the outside of the small diameter tube section 106*a*, which is located below the opening. In the state of FIGS. 7 and 9, the sealing ring 106*d* can contact the second wall S2 of the operating tube 107*b*-2.

It is important to note that the configuration and arrangement of the present application shown in a number of different exemplary embodiments are illustrative only. Although only a few embodiments are described in detail in this disclosure, it should be easy for those who refer to this disclosure to understand that many modifications are possible (for example, the size, scale, structure, shape and proportion of various elements, and parameter values (for example, temperature, pressure, etc.), installation arrangement, use of materials, color Changes in orientation, etc.). For example, an element shown as integrally formed may be composed of a plurality of parts or elements, the position of the elements may be inverted or otherwise changed, and the nature or number or position of discrete elements may be changed or changed. Therefore, all such modifications are intended to be included within the scope of the present invention. The order or sequence of any process or method steps may be changed or reordered according to alternative embodiments. In the claims, any "device plus function" clause is intended to cover the structure described herein for performing the function, and is not only structurally equivalent but also equivalent. Without departing from the scope of the invention, other substitutions, modifications, changes and omissions can be made in the design, operation status and layout of the exemplary embodiments. Therefore, the present invention is not limited to specific embodiments, but extends to a variety of modifications still falling within the scope of the appended claims.

In addition, in order to provide a concise description of exemplary embodiments, all features of the actual embodiments may not be described (that is, those features that are not related to the best mode of performing the invention currently considered, or those features that are not related to the implementation of the invention).

It should be understood that in the development process of any actual implementation, such as any engineering or design project, a large number of specific implementation decisions can be made. Such development efforts may be complex and time-consuming, but for those ordinary technicians who benefit from the public content, they do not need too much experimentation, and the development efforts will be a routine work of design, manufacturing and production.

It should be noted that the above embodiments are only used to illustrate the technical solution of the invention rather than limit it. Although the invention has been described in detail with reference to better embodiments, ordinary technicians in the art should understand that the technical solution of the invention can be modified or replaced equivalently without departing from the spirit and scope of the technical solution of the invention, which should be covered in the scope of claims of the invention.

What is claimed is:

1. An abrasive water jet nozzle for strengthening, comprising:
a chamber (N1), providing a mixing space; and
a strengthening mixing assembly, providing a strengthening mixing of water with abrasive entering said chamber (N1),
wherein the strengthening mixing assembly includes a fluid passage (101) and a water stopper block (102),
wherein the water stopper block (102) is located in an eccentric position on one side of the chamber (N1), and an outlet of the fluid passage (101) is directed towards the water stopper block (102); and
wherein the water stopper block (102) has an impact surface (102a) and a dispersion surface (102b), the impact surface (102a) is curved, the dispersion surface (102b) is symmetrically disposed on both sides of the impact surface (102a), the dispersion surface (102b) extends outward from the impact surface (102a) to an inner wall of the chamber (N1), and the dispersion surface (102b) has an arcuate transition with the inner wall of the chamber (N1).

2. The abrasive water jet nozzle for strengthening of claim 1, wherein the water stopper block (102) has a length along axial direction of the chamber (N1), thickness of the water stopper block (102) protruding from the inner wall of the chamber (N1) is gradually decreased from the impact surface (102a) downwards.

3. The abrasive water jet nozzle for strengthening of claim 1, wherein inlet of the fluid passage (101) is set along the axial direction of the chamber (N1), and the fluid passage (101) is a curved tube with a gradual angle change.

4. The abrasive water jet nozzle for strengthening of claim 1, wherein two abrasive inlets (103) are disposed symmetrically on the chamber (N1), mid-perpendicular surface of axis line of the two abrasive inlets (103) coinciding with a symmetrical surface of the water stopper block (102).

5. The abrasive water jet nozzle for strengthening of claim 4, wherein the chamber (N1) is separated into two mixing chambers (N2) at the bottom by a chamber dividing block (104), and a mixing fluid outlet (P1) is disposed with each mixing chambers (N2) correspondingly,
wherein the chamber dividing block (104) is located on the mid-perpendicular plane of the axis line of the two abrasive inlets (103),
axis of the mixing fluid outlet (P1) and axis of the abrasive inlet (103) are at the same plane.

6. The abrasive water jet nozzle for strengthening of claim 5, wherein a focusing tube (105) is disposed with the mixing liquid outlet (P1), the focusing tube (105) has a jet outlet (105a) inside, and the jet outlet (105a) has a characteristic that a spacing of one opposite side is greater than another spacing of another opposite side.

7. The abrasive water jet nozzle for strengthening of claim 6, wherein the focusing tube (105) is capable of rotating axially;
wherein, the mixing fluid outlet (P1) is provided with a connecting tube (106), the focusing tube (105) extends into the connecting tube (106), and the focusing tube (105) and the connecting tube (106) are sealed by a sealing ring sleeved on the outside of the focusing tube (105).

8. The abrasive water jet nozzle for strengthening of claim 6, wherein the focusing tube (105) is capable of rotating axially,
wherein the mixing fluid outlet (P1) is provided with a connecting tube (106), the focusing tube (105) extends into the connecting tube (106), and a connection between the focusing tube (105) and the connecting tube (106) is established through an angle limiting mechanism (107).

9. The abrasive water jet nozzle for strengthening of claim 8, wherein the angle limiting mechanism (107) comprises a rotating member (107a) disposed on the focusing tube (105) and a limiting member (107b) disposed on the connecting tube (106);
the rotating member (107a) is provided with a number of limiting units (M) arranged in a circumferential direction, the limiting units (M) include a groove (107a-1), a bulge (107a-2) and an arc (107a-3) transiently connected between the groove (107a-1) and the bulge (107a-2), and adjacent grooves (107a-1) have a preset rotation angle; and radial distance from the arc (107a-3) to axis increases gradually in the direction from the groove (107a-1) to the bulge (107a-2);
the limiting member (107b) comprises a ball (107b-1) and an operating tube (107b-2), the connecting tube (106) is provided with an opening capable of accommodating the ball (107b-1); the operating tube (107b-2) is sleeved on the outside of the connecting tube (106), the operating tube (107b-2) has a first wall (S1) and a second wall (S2), and the operating tube (107b-2) is capable of being moved along the connecting tube (106) to change axial positions of the first wall (S1) and the second wall (S2);
when the ball (107b-1) contacts the first wall (S1), the ball (107b-1) is only located in the groove (107a-1); and
when the ball (107b-1) contacts the second wall (S2), the ball (107b-1) contacts the bulge (107a-2).

10. The abrasive water jet nozzle for strengthening of claim 1, wherein inlet of the fluid passage (101) is set along the axial direction of the chamber (N1), and the fluid passage (101) is a curved tube with a gradual angle change.

11. The abrasive water jet nozzle for strengthening of claim 1, wherein two abrasive inlets (103) are disposed symmetrically on the chamber (N1), mid-perpendicular surface of axis line of the two abrasive inlets (103) coinciding with a symmetrical surface of the water stopper block (102).

12. The abrasive water jet nozzle for strengthening of claim 2, wherein inlet of the fluid passage (101) is set along the axial direction of the chamber (N1), and the fluid passage (101) is a curved tube with a gradual angle change.

13. The abrasive water jet nozzle for strengthening of claim 2, wherein two abrasive inlets (103) are disposed symmetrically on the chamber (N1), mid-perpendicular surface of axis line of the two abrasive inlets (103) coinciding with a symmetrical surface of the water stopper block (102).

* * * * *